(12) United States Patent
Hellsten

(10) Patent No.: US 6,373,426 B1
(45) Date of Patent: Apr. 16, 2002

(54) RADAR STATION AND RADAR SYSTEM COMPRISING AT LEAST TWO SUCH STATIONS

(75) Inventor: Hans Hellsten, Linköping (SE)

(73) Assignee: Försvarets Forskningsanstalt, Sundbyberg (SE)

(*) Notice: Subject to any disclaimer, the term of this patent is extended or adjusted under 35 U.S.C. 154(b) by 0 days.

(21) Appl. No.: 08/258,281

(22) Filed: Jun. 14, 1994

(30) Foreign Application Priority Data

Jun. 16, 1993 (SE) .............................................. 9302078

(51) Int. Cl.[7] .............................................. G01S 13/72
(52) U.S. Cl. ........................... 342/59; 342/25; 342/90; 342/95; 342/96; 342/107; 342/113; 342/115; 342/140
(58) Field of Search .............................. 342/59, 25, 90, 342/95, 96, 97, 105, 106, 107, 108, 110, 113, 115, 140, 147, 159, 162, 179, 189, 191, 192, 194, 195

(56) References Cited

U.S. PATENT DOCUMENTS 4,857,934 A  8/1989 Voles ........................ 342/90
5,128,684 A  7/1992 Brown ........................ 342/189

*Primary Examiner*—John B. Sotomayor
(74) *Attorney, Agent, or Firm*—Jacobson Holman, PLLC

(57) ABSTRACT

The invention relates to a radar station placed on the surface of the earth, and to a radar system comprising at least two such radar stations.

The signal-processing equipment of the radar stations is adapted, at each point of time, to calculate probabilities of target positions and radial target velocity in relation to each individual radar station, based on the signals emitted and received by this station. These calculated values are associated over time, giving cumulative probability measures for target positions and radial velocities in relation to each individual radar station.

By providing a system of at least two radar stations, it is possible to calculate the position of a target by associating target positions, such as they are perceived by the different radar stations, with each other by an association of characteristic movements of the target. This is done without having to synchronize the stations. If two stations are used, the target can be located in two dimensions; if at least three stations are used, it can be located in all three dimensions of space.

7 Claims, 2 Drawing Sheets

RADAR STATION AND RADAR SYSTEM COMPRISING AT LEAST TWO SUCH STATIONS

BACKGROUND OF THE INVENTION

The present invention relates to a radar station placed on the surface of the earth in a vehicle, a vessel or a stationary installation, and to a radar system comprising at least two such radar stations.

Conventional radar systems for combat-control purposes are based on monostatic radar technology with sweeping directional microwave lobes. These are vulnerable to telecommunication interference and to the action of signal-homing missiles. Moreover, they are sensitive to measures reducing the radar cross section.

Bistatic and multistatic radar systems are also previously known. Such systems necessitate synchronising the stations included.

SUMMARY OF THE INVENTION

The present invention relies on signal processing which enables the use of a completely omnidirectional antenna. This is most favourable, since such an antenna, as opposed to a directional antenna, can be made very small and, hence, is easy to transport or mount on a land vehicle or a seagoing vessel. Also a low-frequency radar system, operating at frequencies of 10–500 MHz, can be made transportable in this manner.

The signal-processing equipment of the radar stations is adapted, at each moment, to calculate probabilities of target positions and their radial target velocities in relation to each individual radar station, based on the signals transmitted and received by this station. These calculated values are associated over time, which gives cumulative probability measures of target positions and radial velocities in relation to each individual radar station.

By creating a system of at least two radar stations, it is possible to calculate the position of a target by associating target positions, such as they are perceived by the different radar stations, with each other by an association of characteristic movements of the target. This takes place without having to synchronise the stations. If two stations are used, the target can be located in two dimensions; if at least three stations are used, it can be located in all three dimensions of space.

The objects of the invention are achieved by the features recited in the appended independent claims.

BRIEF DESCRIPTION OF THE DRAWINGS

The invention will be described in more detail hereinafter with reference to the accompanying drawings, in which.

DETAILED DESCRIPTION OF THE INVENTION

First, embodiments of the invention will be described in more detail in the form of a discussion of the basic function of the parts included.

A first embodiment relates to a radar station which, with a periodicity of 10 Hz–10 kHz, emits a radar signal of arbitrary polarisation, having a maximum frequency below 500 MHz and a bandwidth exceeding 50% of the maximum frequency. The radar station is located on the ground or on a vessel and comprises a radar transmitter, an antenna system for transmission and reception, a radar receiver and signal-processing equipment. Data are arranged in range R and time t, assuming that the time for the transmission of the radar signal and the reception of the reflex can be determined with an accuracy given by the bandwidth. The signal-processing equipment handles data from a large number of transmission periods (100–10,000), i.e. an integration time of the order of seconds, by performing a large number of independent summations over different ranges and times—one summation for each physically-technically possible range history R(t) (i.e. consistent with a-priori knowledge about velocity and acceleration performance of the targets to be detected).

The choice of low frequencies combined with a large bandwidth provides the unique effect that radar reflexes from targets to be detected (aircraft, ships) become only slowly aspect-angle-dependent, i.e. only slowly variable in time. The coherence length in the radar returns is thus maintained during said long integration times, as opposed to the case of conventional narrow-band radar where they are of the order of one or some milliseconds. Radar amplitudes for range histories exceeding a certain threshold value are noted as detections, so that ships and aircraft can be detected and measured with high sensitivity in respect of small radar cross sections and high accuracy in respect of range assessment.

A second embodiment relates to a radar station where the signal-processing equipment is adapted to sum over all the range histories, based on the assumption that targets travel at a constant speed and a constant transverse acceleration in a fixed two-dimensional plane during the integration time (seconds). Thus, the paths define segments of a circle during this time.

The amount of such paths can be divided into a large number of classes, where each class of paths by conformal transformation is mapped into points covering the surface of a two-dimensional sphere. Since the reflectivity for the target is constant during the integration time, it will be possible to describe the distribution of reflectivities for different targets by functions (one for each class) defined on the sphere. During the same transformations, radar data will be mapped as average values of these reflectivity functions over all the circles with their centres located on a great circle on the sphere. By a known tomography method for reconstructing from such circular average values a reflectivity function on the sphere, the reflectivity is then determined for all the target movements.

A third embodiment relates to a radar station where the signal-processing equipment is designed for implementing the summation of radar data over all target movements on a massively parallel processor consisting of a large number of parallel-operating nodes, by having each class of paths that is mapped on the sphere of a certain conformal transformation be referred to one node. The detection of targets then takes place by each node reconstructing the reflectivity function from radar data for this special sub-class.

A fourth embodiment relates to a radar system where the signal-processing equipment is designed for association of detections provided by communication equipment comprising communication links, e.g. microwave links, between at least two radar stations, each operating according to any of the embodiments described above and being placed in known positions at a distance from each other of between one kilometre and several tens of kilometres. The association is achieved by estimating, for each detected target path at each station, the time linear and quadratic range variation for the target, and, it being understood that the velocity of the target object primarily changes only as to its direction, by using these estimates to calculate the linear and quadratic range variation of the target path, such as it is estimated from the other stations.

By associating detections at different radar stations with one and the same target, if the linear and quadratic range variations estimated from data from the individual stations agree, the position of the detected target is achieved by triangulation, which gives a two-dimensional positioning when using two radar stations, and a three-dimensional positioning when using at least three co-operating radar stations. An extreme angular resolution, substantially corresponding to an antenna area constituting the projection in the viewing direction of the ground surface spanned by the system, is thus achieved, at the same time as the long integration time replaces conventional antenna gain, which means that the individual radar stations can have a substantially omnidirectional antenna diagram and, thus, so small antennas that the system becomes entirely mobile or easily transported. To achieve angular resolution, conventional low-frequency radar technology requires extremely large antennas and, hence, entails stationary installations.

A fifth embodiment relates to a radar system where the signal-processing equipment is designed for association of detections provided by communication equipment comprising communication links, e.g. microwave links, between at least two radar stations, each operating according to any of the first three embodiments described above and being placed in known positions. The association is achieved by having, for each detected circular target path at each station, which is determined according to the third embodiment above, the target represented by a vector pointing from the centre of curvature of the path to the position on the path when detecting the target, which vector can be determined from data from the individual radar station (which is primarily assumed to give no or insufficient angular resolution) up to a rigid rotation about the position of the radar and, thus, given by its length and angle in relation to the position vector for the target position, but unknown as regards the direction of this vector.

By forming the difference between this vector derived from data from one station and the corresponding vector derived from data from the other station, and by letting these two vectors vary by varying the orientation of the position vector for the target position, as seen from one or the other station, and performing this variation so that the difference between the vectors associated with the respective station is brought to its minimum, the orientation of the target is estimated relative to the connecting axis between the two stations. By performing this variation pairwise between the stations for more than two stations, the orientation of the target in space is also obtained completely determined by measurements from at least three stations.

The association according to the fourth and fifth embodiments can be carried out by same signal-processing unit as performs the detection in relation to a station according to any of the embodiments described above or by a special signal-processing unit.

After this basic, however full review, an embodiment will be described below along with an in-depth account of the inventive concept in the form of a mathematical description.

1. Introduction

Radar data consist of a large, but finite number of amplitudes $f(R,t)$ defined over different ranges R and times t. Coherent signal processing is based on the assumption that $f(R,t)$ can be understood as an integral (or sum) of reflection contributions from a transmission of targets, where each target is in motion independently of the other targets. Each such target movement means a relationship between amplitudes $f(R,t)$, $f(R',t')$, $f(R'',t'')$, distributed in space and time. By using these relationships, specific for a certain target, an improved signal-to-noise ratio can be obtained, in power equal to the number of amplitudes to which the target has given a contribution. In practice, this signal-processing gain is limited both by the degree of independence of target movements and by the validity and the accuracy with which radar returns can be modelled on the basis of a-priori assumptions about the targets and their movements.

Here, an essential limitation is the so-called scintillation or fading, which results in that the radar return from a certain object that is measured with a narrow-band radar does not have a predictable intensity other than during small movement variations of the target object. This makes it pointless, for example, to base subsequent radar signal processing on other than the derivatives of the first or possibly the second order motion variations when using narrow-band radar. Scintillation within the individual target or from groups of adjacent targets can be avoided by radar technology based on low frequencies and a large relative bandwidth. The large relative bandwidth makes each resolution cell of the order of a wavelength and, hence, a substantially isotropic scatterer. Radar returns over great aspect-angle changes can thus be correlated. Thus, it also becomes meaningful to study more thoroughly signal processing based on movement variations of higher orders.

It is understood that, provided a target object is moving in a uniform or close to uniform manner, the integration time can be prolonged (i.e. extend over a large number of radar returns), also for narrow-band radar. Off-hand, the radar signal for conventional narrow-band microwave radar should, depending on the stability of the target movement, remain coherent during time periods of the order of a few up to ten or even a hundred milliseconds. Since the radar return for a typical range interval (150 km) is ringing for about half a millisecond, the pulse repetition frequency, PRF, of the radar must be 1 kHz or less to obtain ranges that are of interest. The gain that can be achieved by coherent integration in narrow-band microwave radar thus is limited to, say, 10 dB. For narrow-band low-frequency radar (OTH), the radar signal is known to remain coherent for many seconds. The integration gain may thus become significant. In the case of OTH, the coherence is however strongly dependent on whether the target is manoeuvring, to the extent that a target in some cases may escape detection by constant manoeuvres.

Models for signal processing of higher orders intended for coherently detecting and measuring air targets by radar based on a large relative bandwidth will be discussed herein below. In concrete terms, the radar is assumed to operate over the frequency range 30–80 MHz, i.e. with a 1.5-octave relative bandwidth. The basic concept then is that detection is based only on coherent integration of target range information, i.e. that radar raw data $f(R,t)$ do not contain any angle dependence. In other words, coherent integration replaces antenna gain. Since the method is primarily intended for surveillance applications, where the entire hemisphere requires scanning, antenna gain is possible only on the receiver side (then by multilobe technique). The coherent signal-processing gain discussed becomes fully comparable to what is achieved also with highly efficient multilobe antennas.

According to the proposed concept, angular measurement is achieved by triangulation, assuming that the distance to one and the same target is known to several co-operating radar stations, whose mutual positions are supposed to be known. The total complex of problems to be analysed thus relates to 1) detection of air targets from the respective stations,
2) calculation of the distance to these targets, and
3) association of the detections at the different stations and determination of target position by triangulation.

Detection according to higher-order signal processing is based on each target having a unique history R(t). In fact, the radar principle requires more than that. It must be possible to classify radar data in a class of independent target movements, which, on the one hand, should be so fine that each element represents one target at the most, while at the same time the classification should only be so fine as to permit writing f(R,t) essentially unambiguously as a linear combination of amplitudes from each element in the class. Moreover, to be able to project radar data onto this class, the class must continuously represent all ranges R and, for each range, all the approach velocities presupposed by the pulse repetition time of the radar.

Radar data consist of reflexes from actual targets and noise. The measured function f(R, t) is sampled in K finite range intervals for N radar returns and thus means a finite and fixed number K·N of independent measuring data f($R_k$, $t_i$), $1 \leq k \leq K$, $1 \leq i \leq N$. In principle, this amount of measuring data can be projected on an equally large number K·N of independent target movements. Assume that each target movement is described by a set of constants $X_l=(X_1, l, X_2, l, \ldots, X_M, l)$. If $X_{m, l}$ are each discretized to assume values within e.g. L value bins, there exist $L^M$ vectors $X_l=(X_1, l, X_2, l, \ldots, X_M, l)$ representing target movements. Denote the radar reflex deriving from a single target by f(R, t)=$\Delta_X$(R, t). The projection of radar data on target movements is thus assumed to be $$f \to c_X, \, f(R_k, t_i) = \left(\sum_{l=0}^{L}\right)^M c_{X_l} \Delta_{X_l}(R_k, t_i). \quad (1.1)$$

Ideally, the projection f→$c_X$ has such a property that noise is uniformly distributed over all X's. Consequently, the signal-to-noise ratio $|{}^cX_{target}|^2/|{}^cX_{non-target}|^2$ is a factor N times higher than the corresponding ratio for unprocessed data $f[(R, t)_{target}]^2/f[(R, t)_{non-target}]^2$.

Since the number of measuring data and the number of separable target movements must coincide $$L=(K \times N)^{1/M} \quad (1.2)$$

In other words, the larger the number of parameters required for describing the path, the more uncertain the value of the individual parameters. This means that more than one target movement tend to give rise to the same radar data or, equivalently, that noise can be distributed over the coefficients $c_X$ without this being reflected in data. It is thus of fundamental importance to be able to describe target movements by a minimum of quantities $X_m$. In fact, only when M≈2 will the uncertainty of the path parameters correspond to the uncertainty of the amount of primary radar data.

In respect of air targets, it is understood that there are not a few constant quantities that exactly describe the movement in all parts, since this may partly be stochastic or even intended to circumvent each form of prediction. In this case too, it is however subjected to physical laws, which impose fundamental restrictions on possible and probable movements. For example, air target manoeuvres must take place without involving unreasonable consumption of energy or time in respect of the net transport distance.

A highly essential restriction is that the velocity of the target should remain approximately constant as to its value. Although it is possible for air targets to increase or decrease the velocity, the performance-conditioned capacity of tangential acceleration will fall below, perhaps by one order, the potential regarding radial or turning acceleration. Moreover, tangential acceleration is associated with considerable fuel consumption, and so velocity changes can only take place sporadically. Reasonably, each air target has a velocity that provides optimum trade-off between fuel economy and the time required for carrying out the mission. The approximate constancy of the velocity should therefore make a good assumption on which to base a higher-order detection schedule for air targets.

A further assumption is that also the acceleration, which thus is assumed to be essentially radial, remains constant over relatively long periods (seconds). This assumption can be justified by the fact that manoeuvres are made on demand and that when a demand arises, the manoeuvre is carried out in the shortest possible time. The strain on man and machine then is decisive of what acceleration output is possible. By a constant transverse acceleration with such an acceleration output, the manoeuvre is performed in the most rapid way. As opposed to velocity, the acceleration changes instantaneously and drastically once it changes. To conclude, we thus assume that both velocity and radial acceleration are quantities characteristic of the movement that can be assumed to be constant for at least seconds of the movement of the air target. This time is comparable to that occurring in the case of OTH for targets in uniform motion, but with the difference that it here concerns targets during all forms of manoeuvres.

2. Mathematical Description—Plane Movement

The fact that both tangential velocity and acceleration (which must thus be entirely radially directed) are periodically constant means that the target paths to be detected will be composed of segments of a circle. This is described mathematically under the simplified assumption that the paths are entirely contained in one plane. This plane is designated $E^2$, points in the plane P, Q, U, . . . , vectors $r_p$=PQ, $r_p'$=PU, . . . and polar coordinates are inserted so that, relative to each point P, $r_p$=(r, ψ), $r_p'$=(r', ψ') . . . according to a suitable angular convention.

Figure 1:
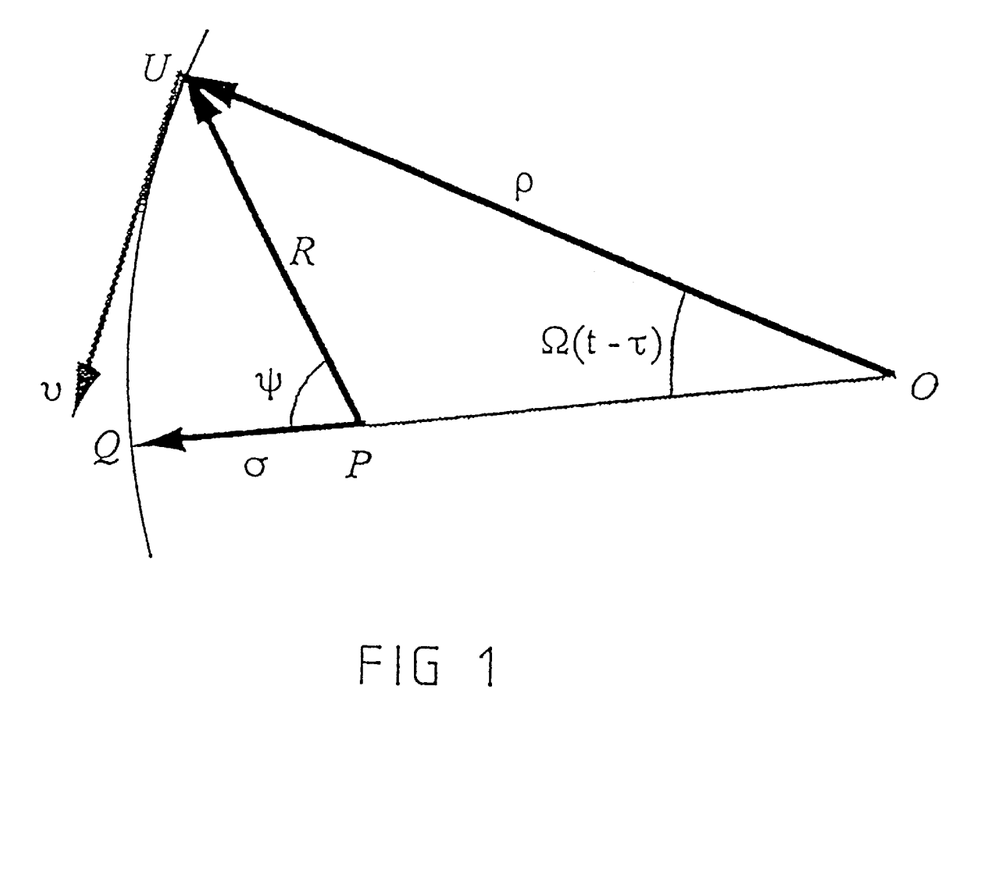
FIG. 1 shows the path geometry of the movements of flying targets in the plane.

A segment of a circular target path is represented in FIG. 1. The point P is the position of the radar station. At time t, the target is in point U while the radius of the circular path is |OU|=ρ.

Centres of curvature, including the degenerated case where the circles are stretched out into straight lines, are contained in the. projective plane $P^2$. This consists of $E^2$ with 1) added infinity points and
2) with diametrically opposed infinity points identified to be one and the same point in the projective plane.

Target paths having the same centre of curvature have the topology $E^3$ (velocity, radius and position on the circular path). The multitude of target paths thus have the topology $E^3 \times P^2$. This multitude cannot be covered by a single singularity-free coordinatisation because the centres of curvature of straight lines are not well-defined in $E^2$. Instead, the limit value of large radii of curvature requires special treatment, in the form of special coordinatisation.

It is noted that for a straight path $\rho \to \infty$. The position Q of the minimum passing range $|PQ|=\sigma$, relative to the radar, can always be assumed to be well-defined and $\sigma$ always finite. The distance to the centre of curvature is $\zeta=\rho\pm\sigma$, depending on whether the path is convex or concave to the radar. Thus, $\zeta=\rho-\sigma$ in the Figure.

The measured range is $|PU|=R$. Designate angle $\angle QPU = \psi$. The angle $\angle QOU$ increases uniformly in time $\angle QPU = \Omega(t-\tau)$, where $\tau$ designates the passage time when the object occupies the nearest position. The angular velocity is related to the velocity by $\Omega=v/\rho$. To specify the flightpath relative to the radar, it is required that the position of Q is indicated by both the range $\sigma$ and the azimuth angle $\phi$. This angle cannot however be resolved by the radar. The radar thus characterises the path by the four time-independent parameters $\Omega, \rho, \tau, \sigma$. It should be noted that according to FIG. 1

$$|UQ| = 2\rho\sin\left[\frac{\Omega(t-\tau)}{2}\right], \quad (2.1)$$

$$\angle UQP = \frac{\pi}{2} - \frac{\Omega(t-\tau)}{2} \Rightarrow$$

$$R[\rho, \varsigma, \Omega(t-\tau)]^2 = |PU|^2$$

$$= \varsigma^2 + 4\rho\varsigma\sin^2\left[\frac{\Omega(t-\tau)}{2}\right].$$

Moreover, the angular movement of the target can be described by the sine theorem:

$$\frac{\rho}{\sin(\pi-\psi)} = \frac{R}{\sin[\Omega(t-\tau)]} \Rightarrow \quad (2.2)$$

$$\psi[\rho, \varsigma, \Omega(t-\tau)] = \arcsin\left\{\frac{\rho\sin[\Omega(t-\tau)]}{R}\right\}.$$

The expression (2.1) means a representation $X=(\Omega, \rho, \tau, \sigma, \phi)$ of target paths. The angle $\phi$ designates the azimuth position of the target path in relation to the radar, which, as mentioned above, cannot be measured per se, since the antenna is omnidirectional and, thus, is averaging over azimuth angles.

Targets are discrete and even close to punctiform. There is thus a small probability that two target paths would intersect and thus together contribute to the radar reflectivity in a certain point in $E^2$ at a certain time t. However, it may be suitable all the same to model the radar signal as dependent on a full continuum of reflectivities distributed over all conceivable target paths (in our case limited to segments of a circle). In this manner, the detection of targets can be based on the fact that certain target paths have, compared with others, a much stronger reflectivity. Noise and other factors will however contribute to all the target paths having a certain weak reflectivity, even if they do not correspond to real targets.

In the present case, and actually in the case of all low-frequency radar with no angular resolution, the radar cannot discriminate between movements which only differ by a time-dependent rotation in $E^2$ about the position P of the radar. We say that two target paths are P-equivalent if there is such a time-dependent rotation taking one to the other. Of course, the radar can only determined target paths up to P-equivalence. It is however assumed that the real targets are so few that there can never be more than one real target path per equivalence class.

The path of a punctiform target is described by a delta function $$R\delta\{R-R[\rho, \zeta, \Omega((t-\tau)]\}\delta\{\Phi-\phi\psi[\rho, \zeta, \Omega(t-\tau)]\}. \quad (2.3)$$

The radar reflectivity can be understood as a function G defined over $E^2$, which to each point $Q \in E^2$ and each time t assigns the sum reflectivity of all punctiform target contributions that intersect Q. If Q is described in polar coordinates R, $\Phi$ relative to the position P of the radar, we can thus write $$G(R, \Phi, t) = \int d\zeta \int d\tau \int g\Omega \int d\phi g_t(\Omega, \rho, \tau, \zeta, \phi) \times \times R\delta\{R-R[\rho, \zeta, \Omega(t-\tau)]\}\delta\{\Phi-\phi-\psi[\rho, \zeta, \Omega(t-\tau)]\} \quad (2.4)$$

Here, $g_t(\Omega, \rho, \tau, \zeta, \phi)$ is the distribution of the radar reflectivity over all the target paths at time t. It is assumed that gt changes only slowly with t and remains almost constant during at least seconds. Radar data means further averaging over $\Phi$ (resealing with R merely is a convention).

$$f(R, t) = \int_0^{2\pi} G(R, \Phi, t)\frac{d\Phi}{R}, \quad (2.5)$$

since the antenna is omnidirectional. It should be noted that G in general does not change slowly in t. Thus, there are no pre-conditions for treating (2.5) as an inverse problem. The inverse problem to be analysed here relates to the above-mentioned concept of P-equivalent classes of target paths.

Assume now that $\phi=0$, $\rho, \zeta \to \infty$ and $\Omega/\rho \to v$, $\rho-\zeta \to \sigma$, where $\sigma, v$ are constant for all the target movements. In this case, the target movement is a pure translation, there being only one target for each pair of $\tau$ und $\sigma$, and for each pair of R and $\Phi$. If no restrictions are adopted in respect of $\Omega, \rho, \tau, \zeta, \phi$, there is in general a three-parameter set of movements ($\Omega, \rho, \phi$ variable) through each point R, $\Phi$. In a real situation, there is, as mentioned above, but a few targets. Let us push this argument further than above by selecting only two of the parameters $\Omega, \rho, \tau, \zeta, \phi$, and assume that there is only one target at the most for each such pair. It should then be noted that the "dynamic" parameters velocity and acceleration may very well be the same for several targets, whereas $\tau$ and $\sigma$, locating the targets in space, tend to become well distributed. We therefore assume the following structure for $g_t$ $$g_t(\Omega, \rho, \tau, \zeta, \phi) = g_t(\tau, \sigma)\delta[\rho-\rho(\tau, \sigma)]\delta[\Omega-\Omega(\tau,\sigma)]\delta[\phi-\phi(\tau, \sigma)] (2.6)$$

Inserting in (2.4) then yields $$G(R, \Phi, t) = \int d\sigma \int d\tau g_t(\tau, \sigma) \times \times R\delta\{R-R[\rho, \sigma, \Omega(t-\tau)]\}\delta\{\Phi-\phi-\psi[\rho, \sigma,\Omega(t-\tau)]\}. \quad (2.7)$$

During the integration (2.5), the delta function disappears over angular arguments, since $g_t$ can be assumed to be independent of $\phi$, and radar data can thus be represented as $$f(R, t) = \int d\sigma \int d\tau g_t(\tau, \sigma)\Delta_{\Omega, \rho, \tau, \sigma}(R, t),$$

where $$\Delta_{\Omega,\rho,\tau,\sigma}(R, t) = \delta\left\{R - \sqrt{\varsigma^2 + 4\rho\varsigma\sin^2\left[\frac{\Omega(t-\tau)}{2}\right]}\right\}. \quad (2.8)$$

Consider the integral $$\int_{-\infty}^{\infty} dt \int_{0}^{\infty} dR\, \Delta_{\Omega,\rho,\tau,\sigma}(R, t)\Delta_{\Omega',\rho',\tau,\sigma'}(R, t). \tag{2.9}$$

Here, the designations $\Omega'=\Omega(\tau',\sigma')$ and $\rho'=\rho(\tau',\sigma')$ have been used. Assume that $\tau \neq \tau'$ and $\sigma \neq \sigma'$. In general, there are thus only a few times t', such that $R_t(\Omega, \rho, \tau, \sigma)=R_t'(\Omega', \rho', \tau', \sigma')$ according to (2.1). Thus, the integral in (2.9) is reduced to a delta function.

$$\delta[R_t(\Omega, \rho, \tau, \sigma)-R_t(\Omega', \rho', \tau', \sigma')], \tag{2.10}$$

which is only zero at discrete times. As a result, (2.9) assumes a finite value different from zero. If, however, $\tau=\tau'$ and $\sigma=\sigma'$, $R_t=R_t'$ becomes identical, i.e. the argument in (2.10) disappears identically and (2.9) becomes divergent. By inserting a constant C having a very small value, this situation can be approximated.

$$C\int_{-\infty}^{\infty} dt \int_{0}^{\infty} dR\, \Delta_{\Omega,\rho,\tau,\sigma}(R, t)\Delta_{\Omega',\rho',\tau',\sigma'}(R, t) \approx \delta(\tau-\tau')\delta(\sigma-\sigma'). \tag{2.11}$$

In other words, there is a map $$f(R, t) \to \tilde{g}_t(\Omega, \rho, \tau, \sigma) = \tag{2.12}$$

$$\int_{t-\Delta t}^{t} f\left\{R - \sqrt{\varsigma^2 + 4\rho\varsigma\sin^2\left[\frac{\Omega(t-\tau)}{2}\right]}\right\} dt$$

such that if $\Delta t$ is sufficiently great, then $$g_t(\Omega, \rho, \tau, \sigma) \approx \frac{1}{C}\tilde{g}_t(\Omega, \rho, \tau, \sigma), \tag{2.13}$$

analogously with (1.1). It is here seen, as could be expected, that (2.12) does not contain any reference to the azimuth angle and, thus, can only at the most enable the path determination up to P-equivalence.

This simple procedure of inverting radar data is not very practical. For example, (2.12) is a 4-parameter integral for which the deduction of the dependence over the parameters requires extensive calculation. Even if it is assumed that there is only one target for each pair of $\tau$, $\sigma$, noise is arbitrarily distributed over all parameters $\Omega$, $\rho$, $\tau$, $\sigma$. Hence, there may be an insensitivity that amplifies the noise for certain parameter combinations and, thus, contributes to increase the risk of false alarm. In this case, there is required a procedure that eliminates the combinations of $\Omega$, $\rho$, $\tau$, $\sigma$ which only insensitively contribute to variations in radar data.

If $\Omega$, $\rho$, $\tau$, $\sigma$ remain constant during N pulse periods, it is possible by a map (2.12) to improve the signal-to-noise ratios N times. Thus, if the pulse period (time interval between radar returns) is $10^{-3}$ seconds and the acceleration and the velocity, i.e. $\rho$ und $v$, are constant for e.g. 10 seconds, a coherent integration gain $G_{proc}$ of about 40 dB is achieved. In a realistic assessment of the dynamic scope of radar raw data, a noise floor of −100 dBm can be expected, based on experience from the radar system CARABAS, patented under Swedish Patents 8406007-8 and 9100898-7. A duty cycle of 50%, i.e. a transmitted signal having a length of about 1 ms, is here assumed. The noise floor is thus set by radio noise over 1 kHz bandwidth.

Thus, the noise floor after coherent integration is −140 dBm, while signals exceeding −130 dBm can be detected.

Assuming a radar cross section $\sigma_{ant}$=200 m$^2$ for antenna and $\sigma_{trg}$=5 m$^2$ for target and a range R=100 km, then there is required according to the radar equation $$P_{ret} = \frac{\sigma_{ant}\sigma_{trg}}{(4\pi)^2 R^4} P_{trm}, \tag{2.14}$$

a transmission power of about 1 kW for detection.

3. Structuring of the Inverse Problem

Let $\mathfrak{I}_0^4$ designate the amount of all circular target paths distributed in classes with respect to P-equivalence. According to the above, such a class is defined by four parameters, e.g. $v$, $\rho$, $\tau$, $\sigma$. For the sake of simplicity, let us also name such as class a target path, it being understood that the absolute azimuth position of the target path is indefinite. Designate the space of pairs of range R and time t $\mathfrak{R}^2$. Radar data thus pertain to the space $1(\mathfrak{R}^2)$ of functions defined on $\mathfrak{R}^2$. Also, the "radar image", i.e. reflectivity intensity distributed over individual targets, is an element in the space $1(\mathfrak{I}_0^4)$ of functions defined on $\mathfrak{I}_0^4$. The forward mapping (2.4), which for each scenario of an arbitrary number of target movements with associated, however arbitrary reflectivity intensities linearly associates an output of radar data, is denoted by $$\wp:l(\mathfrak{I}_0^4) \to l(\mathfrak{R}^2). \tag{3.1}$$

An approximate inverse functional $\wp^{-1}: 1(\mathfrak{R}^2) \to 1(\mathfrak{I}_0^4)$ is defined by (2.12), however with the unclarities, e.g. in respect of noise increase, as mentioned above. Promotive of the noise increase is the fact that target paths intersect to a varying and currently unstructured degree.

We compare the present problem with SAR, where the inverse problem is well-defined, but where nonetheless further target parameters, in addition to the position of the objects in the SAR image, must be set for obtaining a high-resolution radar image. Radar data for SAR have the structure $f(R+\tau, Vt)$. Aircraft velocity V and time delay $\tau$ in the radar system are such further parameters which must be correctly evaluated. This type of extra parameters is often known as processing parameters. We prefer to see the problem such that the SAR configuration specifically relates to a special class of target paths, namely such as are generated by a flow $E^2 \to E^2$ along curves given by $$R = \tau + \sqrt{y^2 + (x-Vt)^2} \tag{3.2}$$

For each choice of $\tau$ and V, we can convert this into a SAR image, i.e. a 2-parameter family of target paths $\mathfrak{I}_{V,\tau}^2$, which covers every output of radar data $\wp_{V,\tau}\{1(\mathfrak{I}_{V,\tau}^2)\}=1(\mathfrak{R}^2)$ and where the target paths within each $\mathfrak{I}_{V,\tau}^2$ do not intersect. Each target path is given by two coordinates $(x,y) \in E^2$. Thus, reflectivity functions $g \in l(\mathfrak{I}_{V,\tau}^2)$ can be written as $g(x,y)$. The inverse problem can be solved, and we find the common SAR inversion $\wp_{V,\tau}^{-1}$.

If $f(R,t)$ is radar data, $\wp_{V,\tau}^{-1}(f)=g$.

Normally, the SAR procedure is assumed to yield a high-resolution image only for a certain pair of V, $\tau$. However, if targets exist which have other parameters V, $\tau$, these may very well be imaged by new processing using a new parameter choice. In reality, this may be the case of objects in motion or underground objects (corresponding to delays $\tau$). Processing can thus be effected against more than two parameters, without this having to degrade the sensitivity in the evaluation of the separate parameters. As appears, the pre-requisite is that processing can take place with certain parameters set as fixed processing parameters. The following structure formalises this situation to a well-defined procedure for multi-parameter data, where no uncontrollable noise increase need occur.

Assume that we can split $\Im_0^4$ into a 2-parameter family (parameterised $\alpha$, $\beta$) of spaces of 2-parameter target paths $\Im_{\alpha,\beta}^2$ (more correctly 2-parameter classes of P-equivalent target paths) such that:

Each target path in $\Im_0^4$ belongs to one, but only one family $\Im_{\alpha,\beta}^2$ The target paths within each $\Im_{\alpha,\beta}^2$ constitute a flow $H_t$, $\alpha,\beta:E^2 \to E^2$ (a map $E^2 \to E^2$ for each time t) where the flow lines do not intersect.

The restrictions $\wp_{\alpha,\beta}$ of $\wp$ to $l(\Im_{\alpha,\beta}^2)$ covers each radar data output: $\wp_{\alpha,\beta}\{l(\Im_{\alpha,\beta}^2)\}=l(\Re^2)$.

Radar data are defined as $$f(R, t) = \int_0^{2\pi} g_{\alpha,\beta}[H_{t,\alpha,\beta}(R\cos\phi, R\sin\phi)]d\phi. \quad (3.3)$$

It is now possible to invert radar data by searching for all inverses $\wp_{\alpha,\beta}^{-1}$ ($g_{\alpha,\beta} = \wp_{\alpha,\beta}^{-1}$ (f)) for $\alpha,\beta$ variable. For each fixed $\alpha,\beta$, the inversion is substantially unambiguous and stable, since the interval of target paths for $g_{\alpha,\beta}$ is 2-parametric and, moreover, the paths do not intersect. Therefore, no noise increase need take place for any such inversion. The subsequent detection of target paths is based on detection for each fixed pair of $\alpha,\beta$.

In order to put the inversion problem in the form suggested above, a first step is to give the amount of target paths a more symmetric structure. It has already been noted that rectiliear target paths constitute a limit value of the circular ones. To be able to deal with the inversion problem in a rational way, it is desirable that the rectilinear target paths exist along with the circular target paths in a regular and symmetrical way. This is achieved by one-point compactification of $E^2$ by stereographic projection. A good insight into stereographic projection and its properties here used is given in Ahlfors L. V. (1966): Complex Analysis: —An introduction to the theory of analytic functions of one complex variable; McGraw-Hill Book Company, New York.

To the purpose here specified, we identify vectors $r_p = PQ = (R, \phi) \epsilon E^2$ by complex numbers R $e^{i\Phi}$. Denote by $S_P^2$ the sphere of diameter $D_0$, tangent to $E^2$ in P, and cover it with polar coordinates $(\theta,\psi)$, where $\theta$ is the polar angle calculated from P. The diameter $D_0$ is chosen to be of the same order as the range of the radar. The stereographic maps thus becomes $$(\theta, \psi) \longrightarrow D_0\tan\left(\frac{\theta}{2}\right)e^{i\phi}. \quad (3.4)$$

As is well-known, stereographic projection maps circular arcs on circular arcs, i.e. the target paths are projected by stereographic projection to circles on $S_P^2$. However, while the rotational movement in $E^2$ is uniform, it will become non-uniform when projected on $S_P^2$ by the inverse of the steographic projection. It should however be noted that a range element $d\sigma$ on $S_P^2$ is related to a range element ds in $E^2$ according to $$d\sigma^2 = D_0^2(d\phi^2\sin^2\theta + d\theta^2)$$

-continued $$= D_0^2\left[d\phi^2 4\sin^2\left(\frac{\theta}{2}\right)\cos^2\left(\frac{\theta}{2}\right) + d\theta^2\right],$$

$$ds^2 = d\phi^2 R^2 + dR^2$$

$$= d\phi^2 D_0^2 4\tan^2\left(\frac{\theta}{2}\right) + d\theta^2 \frac{D_0^2}{\cos^4\left(\frac{\theta}{2}\right)}.$$

Hence, $$ds = \frac{d\sigma}{\cos^2\left(\frac{\theta}{2}\right)} = \left[1 + \left(\frac{R}{D_0}\right)^2\right]d\sigma. \quad (3.5)$$

This shows that stereographic projection has the property of being conformal, i.e. angle-preserving. It follows that a movement which is projected on $S_P^2$ by inverse stereographic projection undergoes a velocity reduction $1/[1+(R/D_0)]$ which thus is dependent only on the range R from P. This, in turn, means that by transforming radar data according to $$f(R, T) \longrightarrow f_{konf}(R, t) = f\left\{R, \left[1 + \left(\frac{R}{D_0}\right)^2\right]t\right\}, \quad (3.6)$$

then uniform target movements in $E^2$ are transformed into uniform target movements on $S_P^2$. In other words, the projection of f(R, t) on uniform circular target movements in $E^2$ is equivalent to the projection $f_{konf}(R, t)$ on uniform circular target movements on $S_P^2$. The gain here is that straight paths have been transformed into circles passing through P's antipode on $S_P^2$, also by a uniform circular movement.

Let $R_{\theta,\phi}$ stand for a 1-parameter subgroup of rigid rotations of $S_P^2$, acting about some point $(\theta,\phi)\epsilon S_P^2$ at the angular velocity $\Omega$. Evidently, $R_{\theta,\phi}$ gives rise to a flow $R_{\Omega t}\epsilon R_{\theta,\phi}:S_P^2 \to S_P^2$ of uniform circular target movements on $S_P^2$. $\Im_0^4$ can now be divided into subspaces $\Im_{\eta,\Omega}^2$, parameterised by the angular frequency $\Omega$ for the target movement on $S_P^2$, and a further parameter $\eta$, the nature of which will be explained in more detail hereinbelow. Since the radar is not able to resolve $\phi$, parameterisation of these subspaces should also be independent of $\phi$. Thus, we have a configuration where we can solve the inverse problem and find inverses $\wp_{\eta,\Omega}^{-1}$.

Note in particular rotations $R_{\pi/2,\phi}$ about points on the equator (parallel to $E^2$ given by $\theta=\pi/2$. We define $\Im_{1,\Omega}^2$ as the space of flows $R_{\Omega t}\epsilon R_{\pi/2,\phi}:S_P^2 \to_P^2$ for an arbitrary $\phi$. The problem of finding $\wp_{1,\Omega}^{-1}$ can be related to a previously solved ISAR problem, which precisely coincides with the case of $\theta=\pi/2$. Thus, radar data constitute circular average values having their centres on a major circle through P, while the object function is defined with respect to an axis of rotation parallel to $E^2$ which transforms radar data into each other. This configuration makes it especially rewarding to invert data.

This observation can be used to further define the choice of sub-families of $\Im_0^4$. It is noted that a transformation $u_\eta:z \to \eta z$, $\eta$ being real, transfers radar data on radar data $U_\eta:l(\Re^2) \to l(\Re^2)$. Simultaneously, it constitutes a conformal transformation which thus, by suitable time scaling, transfers target movements on target movements (uniform movements are transferred on uniform movements, circular movements on circular movements) $U_\eta:l(\Im_0^4) \to l(\Im_0^4)$. Given that $\wp_{1,\Omega}^{-1}$ is known, a new class of inverse functions $\wp\eta$, $\Omega^{-1}$=$U_{\eta\wp1,\Omega^{-1}}U_\eta^{-1}$:$l(\Re^2)\to l(\Im_{\eta,\Omega}^2)$ is obtained. Thus, all inverses $\wp_{\eta,\Omega}^{-1}$ are determined by $\eta=1$, while all spaces $\Im_{\eta,\Omega}^2=u_\eta\Im_{1,\Omega}$ span the entire $\Im_0^4$. In this manner, the inverse problem has been given both the above-mentioned structure of projection on disjunct subspaces and also a solution for these subspaces.

4. Adaption of AASR to the ISAR Problem

First, we derive the map $\Im_{\eta,\Omega}^2 \to \Im_0^4$. We start by studying the special case $\Im_{1,\Omega}^2 \to \Im_0^4$.

Consider a rigid rotation of the sphere $S_P^2$ through the angle $\pi/2$ taking a system of circles concentric about the equatorial axis (parallel to $E^2$) to a system of circles concentric about the polar axis (perpendicular to $E^2$). The rotation is represented by stereographic projection (by a suitable choice of the azimuth angle $\phi$, which anyway cannot be measured)

$$z \to w = \frac{z+D_0}{z-D_0}. \quad (4.1)$$

Denote the circles on $S_P^2$ concentric about the equatorial axis by $\sigma_\theta^1$ (where $\theta$ is the polar angle with respect to the equatorial axis) and the circles concentric about the polar axis by $\Sigma_\theta^1$. Denote the conformal projections of the circle families on $E^2$ by $s_\theta^1$ and $S_\theta^1$, respectively. The rotation maps $\Sigma_0^1 \to \sigma_\theta^1$ and, thus, $S_\theta^1 \to s_\theta^1$. According to (3.4), the circles $S_\theta^1$ have radii $$R = D_0 \tan\left(\frac{\theta}{2}\right). \quad (4.2)$$

The circles $s_\theta^1$ are given equations according to (4.1)

$$D_0^2 \tan^2\left(\frac{\theta}{2}\right) = \frac{|z-D_0|^2}{|z+D_0|^2}. \quad (4.3)$$

According to (4.3), the circles $s_\theta^1$ are located with their centres on the real axis, since a complex-conjunction $z \to \bar{z}$ gives an identical equation, i.e. the same circle. Each fixed $\theta$ gives a circle $s_\theta^1$ having the radius $\rho(\theta)$ and centre distance $\zeta(\theta)$, however such that $s_\theta^1$ for different $\theta$'s are not concentric. We calculated $\rho$ and $\zeta$ by deriving the points of intersection of the circles with the real axis, by solving the equation $$R^2 = \frac{x^2 - 2D_0 x + D_0^2}{x^2 + 2D_0 x + D_0^2} \quad (4.4)$$

where $R=D_0\tan(\theta/2)$ is assumed to be fixed. We will have the roots $$\frac{x_1}{D_0} = \frac{(D_0+R)^2}{(D_0-R)(D_0+R)} = \frac{D_0+R}{D_0-R} \quad (4.5)$$

$$\frac{x_1}{D_0} = \frac{(D_0-R)^2}{(D_0-R)(D_0+R)} = \frac{D_0-R}{D_0+R}$$

where $$\frac{\varsigma}{D_0} = \frac{x_1+x_2}{2D_0} = \frac{(D_0+R)^2+(D_0-R)^2}{2(D_0-R)(D_0+R)} = \frac{D_0^2+R^2}{D_0^2-R^2} \quad (4.6)$$

-continued $$\frac{\rho}{D_0} = \frac{x_1-x_2}{2D_0} = \frac{(D_0+R)^2-(D_0-R)^2}{2(D_0-R)(D_0+R)} = \frac{2D_0 R}{1-R^2}.$$

The insertion of (4.2) gives the map $\sigma_\theta^1 \to s_\theta^1$ $$\varsigma = D_0 \frac{1+\tan^2\left(\frac{\theta}{2}\right)}{1-\tan^2\left(\frac{\theta}{2}\right)} = \frac{D_0}{\cos\theta} \quad (4.7)$$

$$\rho = D_0 \frac{2\tan\left(\frac{\theta}{2}\right)}{1-\tan^2\left(\frac{\theta}{2}\right)} = D_0 \tan\theta.$$

The subclass $\Im_{1,\Omega}^2$ thus comprises the subset of all paths satisfying $$\rho(\varsigma) = \sqrt{\varsigma^2 - D_0^2} \quad (4.8)$$

Note that $\rho$ always is $<\varsigma$, and that a straight path corresponds to $\rho$, $\varsigma \to \infty$.

In subclass $\Im_{1,\Omega}^2$, it is also required that all objects are moving on the sphere $S_P^2$ at the same angular velocity $\Omega$. This means that the velocity of an object moving along the circle $\sigma_\theta^1$ should be $D_0\Omega \sin\theta$. As shown in (3.5), the velocity is scaled by $ds=[1+(R/D_0)^2]d\sigma$ in stereographic projection. The velocity on $E^2$ along the target path $s_\theta^1$ thus becomes $$v = \left[1+\left(\frac{R}{D_0}\right)^2\right] D_0\Omega\sin\theta = \left[1+\left(\frac{R}{D_0}\right)^2\right] D_0\Omega\sqrt{1-\left(\frac{D_0}{\varsigma}\right)^2}. \quad (4.9)$$

By rescaling time in radar data as mentioned in the foregoing paragraph, velocities are scaled, such that the subclass $\Im_{1,\Omega}^2$ includes all paths having the velocities $$v(\varsigma) = D_0\Omega\sqrt{1-\left(\frac{D_0}{\varsigma}\right)^2}. \quad (4.10)$$

To sum up, the class $\Im_{1,\Omega}^2$ contains one path for each $\varsigma$ (alternatively, one path through each point in $E^2$) and is thus given by one radius of curvature and one velocity (4.10) for each $\varsigma$. Note that $v(\infty)=D_0\Omega$ is the velocity of the special path (which is straight) through P.

We now consider the other classes of paths $\Im_{\eta,\Omega}^2$. According to the foregoing paragraph, these are related to $\Im_{1,\Omega}^2$ by a conformal mapping $z \to z/\eta$ in $E^2$. Such a map changes the metric in $E^2$ according to $ds \to ds/\eta$, and thus, velocities $v \to v/\eta$. Further, there is a change of $\zeta \to \zeta/\eta$ and $\rho \to \rho/\eta$. Thus, the following relations apply $$\rho(\varsigma) = \sqrt{\varsigma^2 - \eta^{2D_0^2}} \quad (4.11)$$

$$v(\varsigma) = D_0\Omega\sqrt{1-\left(\frac{\eta D_0}{\varsigma}\right)^2} \quad (4.11)$$

as a characterisation of the subpaths in $\Im_{\eta,\eta\Omega}^2$. It is given that for each target movement (given by $v,\rho,\tau,\sigma$) there is one $\eta$, and one $\Omega$, so that the target movement is comprised by one of the families $\Im_{\eta,\Omega}^2$.

5. ISAR Mapping

ISAR mapping is dealt with e.g. in Gustavsson J.: A numerical implementation of the ISAR algorithm; FOA report D 30543-3.3; Linköping 1989, Hellsten H.: Image reconstruction with radar data from linear aperture; FOA report C 30564-3.3; Linköping 1990 and Nilsson S.: A Fourier method for the stabilization of the ISAR algorithm; FOA report D 30578-3.3; Linköping 1990.

The class of paths $\mathfrak{I}_{n,\Omega}{}^2$ which is given by (4.11) can be treated with the ISAR algorithm by rescaling radar data, first by multiplication of range $R \to R/\eta$, and then by rescaling of time according to (3.6).

Hence, $$f(R, t) \to f_{konf}(R, t) = f\left\{\frac{R}{\eta}, \left[1 + \left(\frac{R}{\eta D_0}\right)^2\right] t\right\}. \tag{5.1}$$

This mapping technique will now be recapitulated.

Figure 2:
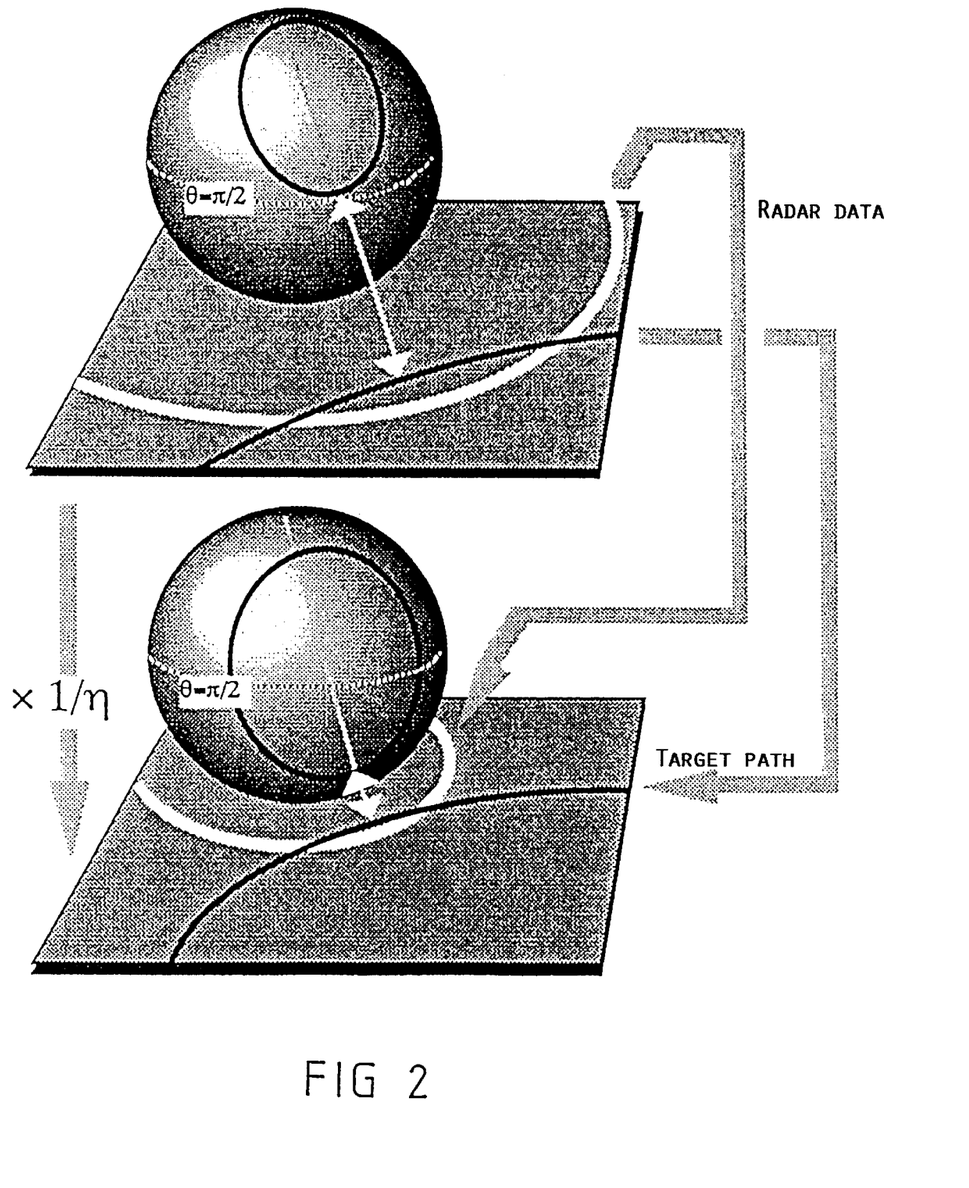
FIG. 2 shows an analogy to the ISAR problem as it appears from the reports of the Research Institute of the Swedish National Defence (FOA) stated in Chapter 5 below. A target path (in the Figure almost a straight path) is scaled by multiplication by $1/\rho$ to a path concentric on the sphere about $\theta=\pi/2$. Radar data are at the same time scaled in range.

Consider the flow $R_{\Omega t}: S_P{}^2 \to S_P{}^2$ given by a 1-parameter subgroup $R_{\pi/2,\phi}$ of rotations of $S_P{}^2$ discussed in Chapter 3. More explicitly, $R_{\pi/2,\phi}$ is a family of rotations $R_{\Omega t}$, which at time t has rigidly rotated the sphere through the angle $\Omega t$. In the foregoing, we have considered circle families $\sigma_\theta{}^1$ and $\Sigma_\theta{}^1$. Let $\{\psi\}$ be a point of the circle $\sigma_\theta{}^1$, given by an angle $\psi$, selected so that $\psi=0$ points towards $E^2$ (downwards in FIG. 2). Then, since $R_{\Omega t}$ maps $\sigma_\theta{}^1$ on itself, $\{\psi\} \in \sigma_\theta{}^1 \to \{\psi + \Omega t\} \in \sigma_\theta{}^1$ is mapped. The circle system $\Sigma_\theta{}^1$ is concentric about the point $\{0\} \in \sigma_{\pi/2}{}^1$. Thus, this is transferred to a new circle system $\Sigma_\theta{}^{1'}$ concentric about a point, $\{\Omega t\} \in \sigma_{\pi/2}{}^1$ under the influence of $R_{\Omega t}$. This system is denoted by $\Sigma_\theta{}^{1'} = \Sigma_{\theta,\Omega t}{}^1$. In particular, $\Sigma_\theta{}^1 = \Sigma_{\theta,0}{}^1$.

A function $g \in l(\mathfrak{I}_{n,\Omega}{}^2)$ is defined by being assigned a value for each point $\{\psi\}$ on each $\sigma_\phi{}^1$. Thus, this function can be parameterised as $g(\theta,\psi)$. In connection with the ISAR problem, we are primarily interested in parameterisations with respect to the circle systems $\Sigma_{\theta,\alpha}{}^1$. We write $g(\theta, \psi) = G_\alpha(\theta',\psi')$, where $\{\psi\} \in \sigma_\theta{}^1$ and $\{\psi'\} \in \Sigma_{\theta',\alpha}{}^1$ denote the same point on $S_P{}^2$.

Parameterisations with respect to the circle systems $\Sigma_{\theta,\alpha}{}^1$ are justified by radar data constituting average values over precisely these circles. Analogously with (3.3), $$f_{konf}\left[D_0 \tan\left(\frac{\theta}{2}\right), t\right] = \int_0^{2\pi} G_{\Omega t}(\theta, \psi) d\phi. \tag{5.2}$$

Thus, radar data are eigenfunctions of rotations mapping the circles $\Sigma_{\theta,\alpha}{}^1$ on themselves. By also expanding the functions $G_\alpha \in l(\mathfrak{I}_{n,\Omega}{}^2)$ in such eigenfunctions, a solution of the ISAR problem is possibe.

So-called spherical harmonics have the desired property of constituting a complete functional system on the sphere, and of being eigenfunctions for a 1-parameter rotational group. For spherical harmonics and their transformation properties during rotations, see Gefland I. M., Minlos R. A., Shapiro Z. Ya. (1963): Representations of the rotation and Lorentz groups and their applications; Pergamon Press, Oxford.

Spherical harmonics are defined from associated Legendre polynomials. When using spherical harmonics and Legendre polynomials of extremely high frequencies (rapidly oscillating over the sphere), it is essential that they be defined and constructed in a numerically stable manner. This means that the recurrence algorithms which are to define them should be numerically stable, cf. Press W. H., Flannery B. P., Teukolsky S. A., Vetterling W. T. (1986): Numerical Recipes—The art of scientific computing; Cambridge University Press, Cambridge; and that they are thus directly defined in a normalized form (and thus are given by amplitudes of the magnitude one). The normalized associated Legendre polynomials (from which we thus construct spherical harmonics) are denoted by $P_m{}^n(x)$; $-1 \leq x \leq 1$, $n=0, 1, 2, \ldots, |m| \leq n$. These are defined by the stable recurrence algorithm.

$$P_m^n(x) = \frac{x(2n-1)P_m^{n-1}(x) - \sqrt{(n-m-1)(n+m-1)} \, P_m^{n-2}(x)}{\sqrt{(n-m)(n+m)}} \tag{5.3}$$

which is initiated by $P_m{}^m(x)$, $P_m{}^{m+1}(x)$ and proceeds to $P_m{}^N(x)$ for a given (great) value N. We then have $$P_m^m(x) = \sqrt{\frac{(2m-1)!!}{(2m)!!}} \left(-\sqrt{1-x^2}\right)^m, \tag{5.4}$$

$$P_m^{m+1}(x) = x\sqrt{2m+1} \, P_m^m(x)$$

where n!! denotes the product of all odd integers $\leq n$. Spherical harmonics $Y_M{}^n(\theta, \psi)$ are defined as $$Y_m^n(\theta, \psi) = e^{im\psi} P_m^n(\cos \theta) \tag{5.5}$$

With this definition, $$\int_0^{2\pi} d\psi \int_0^\pi d\theta Y_m^n(\theta, \psi) \overline{Y_{m'}^{n'}}(\theta, \psi) \sin\theta = \frac{\sqrt{(2n+1)(2n'+1)}}{4\pi} \delta_{n,n'} \delta_{m,m'} \tag{5.6}$$

Thus, for a function $G(\theta, \psi)$ defined over the sphere (5.6)

$$G(\theta, \psi) = \sum_{n=0}^{N} \sqrt{\frac{2n+1}{4\pi}} \sum_{m=-n}^{n} d_m^n Y_m^n(\theta, \psi) \tag{5.7}$$

where $$d_m^n = \int_0^{2\pi} d\psi \int_0^\pi d\theta \overline{Y_m^n(\theta, \psi)} \, G(\theta, \psi) \sin\theta$$

Assume nowthat $\{\psi\} \in \Sigma_{\theta,\alpha}{}^1$. The requirement that $G_\alpha(\theta, \psi) = G_\alpha(\theta',\psi')$, where $\{\psi\} \in \Sigma_{\theta,\alpha}{}^1$ and $\{\psi'\} \in \Sigma_{\theta',\alpha}{}^1$ denote the same point on $S_P{}^2$ leads to $d_m{}^n$ being functions of $\alpha$. These functions satisfy the coupled differential equations.

$$2i \frac{d}{d\alpha} d_m^n = \sqrt{(n-m+1)(n+m)} \, d_{m-1}^n + \sqrt{(n-m)(n+m+1)} \, d_{m+1}^n \tag{5.8}$$

It should be noted that $Y_0{}^n(\theta, \psi) = P_0{}^n(\cos \theta)$ is independent of $\psi$. Thus, according to (5.2)

$$d_m^n(\alpha) = \int_0^\pi d\theta P_0^n \cos\theta \left(\int_0^{2\pi} G_\alpha(\theta, \psi) d\psi\right) \sin\theta \tag{5.9}$$

$$= \int_0^\pi d\theta P_0^n \cos\theta \, f_{konf}\left[D_0 \tan\left(\frac{\theta}{2}\right), \frac{\alpha}{\Omega}\right] \sin\theta.$$

From properties of Legendre polynomials follows that $$d_m^n = 0 \text{ for } m > n, \quad d_m^n(\alpha) = (-1)^n d_{-m}^n(\alpha + \pi). \tag{5.10}$$

By the three relationships (5.9) and (5.10), the solution of (5.8) will be unambiguously given by radar data for different values of $\alpha$, or, alternatively, different times (given that the angular velocity $\Omega$ is assumed). The equation describes the so-called ISAR problem, which thus can be solved formally.

It also describes the problem, in the present application, of finding the subclass of target paths within $\Im_{\eta,\Omega}^2$.

The solution of (5.8) is obtained in a numerically stable way by Fourier transform technique. Under a Fourier transform $d_m^n(\alpha) \to D_m^n(k)$, (5.8) changes to $$-2kD_m^n = \sqrt{(n-m+1)(n+m)} D_{m-1}^n + \sqrt{(n-m)(n+m+1)} D_{m+1}^n \quad (5.11)$$

The relationships (5.10) change into $$D_m^n = 0 \text{ for } m>n, \quad D_m^n = (-1)^{n+k} D_{-m}^n. \quad (5.12)$$

Radar data are introduced in the solution by Fourier transform of (5.9)

$$D_0^n(k) = \int_0^{2\pi} d\alpha \int_0^{\pi} d\theta \, e^{-ik\alpha} P_0^n(\cos\theta) f_{konf}\left[D_0 \tan\left(\frac{\theta}{2}\right), \frac{\alpha}{\Omega}\right] \sin\theta \quad (5.13)$$

It is then relatively easy to numerically calculate $D_m^n$ for all m's and n's, so that $|m|<n \leq N$ for any given great N. From $D_m^n(k)$ we derive $d_m^n(\alpha)$ by an inverse Fourier transform. Normally, we are only interested in $d_m^n(\alpha)$ at a certain time, e.g. t=0. We then only have to calculate (note that $D_m^n(k)$ is defined on a discrete Fourier spectrum of maximum frequency k=n)

$$d_m^n(0) = \sum_{k=-n}^{n} D_m^n(k). \quad (5.14)$$

We then have $G_0(\theta, \psi)$ from (5.7). It is noted that we can write $$D_0^n\left(\frac{k}{\Omega}\right) = \int_0^{2\pi/\Omega} dt \int_0^{\pi} d\theta \, e^{-ikt} P_0^n(\cos\theta) f_{konf}\left[D_0 \tan\left(\frac{\theta}{2}\right), t\right] \sin\theta \quad (5.15)$$

$$d_m^n(0) = \Omega \sum_{k=-n}^{n} D_m^n\left(\frac{k}{\Omega}\right).$$

This expression shows that the ISAR inversion can be performed independently of the angular velocity $\Omega$. Processing against different angular velocities then takes place by different summation procedures (5.15).

6. Association Between Stations

Air targets are detected by the function $G_t(\Omega, \rho, \tau, \sigma)$ reaching a local maximum exceeding a certain critical level. Thus, we know $\Omega, \rho, \tau, \sigma$ valid for the flightpath at time t. Detection does not give an unambiguous determination of the position U of the aircraft and time t. As mentioned, the azimuth angle to the target cannot be determined by means of one radar station only.

This Chapter has analysed the issue whether these radar stations can cooperate to eliminate the remaining uncertainty in the positioning from one station. Let us assume for the time being that it is possible from radar data to determine $|PO|, |PU|, \angle OPU$, where P is the position of the radar, O the centre of curvature and U the position of the target. This will be further discussed at the end of this Chapter.

We again consider plane movement and limit the analysis to two stations being available and located in points P and W in the plane. We extend the notion P-equivalence to applying to each quantity defined for $E^2$. For example, we say that two vectors in the plane, $r_0$ and $r_{0'}$ (with foot-points in 0 and 0', respectively), are P-equivalent if, by a rotation about P taking $0 \to 0'$, we also have $r_0 \to r_{0'}$. By dividing all vectors into classes according to P-equivalence, the measuring values $\zeta=|OP|, \rho=|OU|, \Omega(t-\tau)=\angle POU$ (cf. FIG. 1) precisely determine such a class $\{r_0\}_P$.

Given any two vectors $r_0$ and $r_{0'}$, having the same length $|r_0|=|r_{0'}|$, there is one and only one point P such that a rotation about P maps $r_0 \to r_{0'}$. Thus, if $r_0$ and $r_{0'}$ are P-equivalent, then they are not W-equivalent for $P \neq W$. Thus, the intersection $$\{r_0\}_P \cup \{r_0\}_W$$

either is empty or contains at the most one element $r_0$. It follows that if the two radar stations in P and W are detecting the same target and, hence, determine the two classes $\{r_0\}_P$, $\{r_0\}_W$, then there is only one common vector ro in this class which can be extracted from the parameters $\Omega, \rho, \tau, \sigma$, valid for the detections at the respective stations. The origin of this vector constitutes the centre of curvature, while its end point is the target position, which positions are thus extracted from radar data.

It is of course possible that classes $\{r_0\}_P$, $\{r_0\}_W$, deriving from two different targets, would by chance contain a common vector. If so, further detections determining classes $\{r_{0'}\}_P$, $\{r_{0'}\}_W$, should exist such that $$\{r_{0'}\}_P \cup \{r_0\}_W \text{ and } \{r_0\}_P \cup \{r_{0'}\}_W$$

each contain one element. By always performing matching, so that no elements remain unmatched, the positioning of several targets can be carried out unambiguously.

The following procedure is practically usable for carrying out said matching. Let all detections in P correspond to classes with respect to P-equivalence $$\{r_0\}_{P|1}, \{r_0\}_{P|2}, \ldots, \{r_0\}_{P|N}.$$

All detections in W should correspond to classes $$\{r_0\}_{W|1}, \{r_0\}_{W|2}, \ldots, \{r_0\}_{W|N}.$$

Each pair of classes gives $$<\{r_0\}_{P|i}|\{r_0\}_{W|k}> = \text{Min}\{|o-r_0|^2; r_0 \in \{r_0\}_{P|i}, r_0' \in \{r_0\}_{W|k}\}. \quad (6.1)$$

We now form $$\aleph = \sum_{i=0}^{N} \sum_{k=0}^{M} \langle \{r_0\}_{P|i} | \{r_0\}_{W|k} \rangle. \quad (6.2)$$

It is seen that N is a function of the pairing of detections at the two stations. Matching of observations is achieved by searching for the pairing that minimises N. It is noted that N also constitutes a collective value of the measuring error in the measurement of all targets.

To conclude, we will now discuss a form of ambiguity in the above-mentioned association procedure which emanates from the fact that the function f(R,t) is unable to determine parameters $|PO|, |PU|, \angle OPU$ quite unambiguously. It appears from (6.1) that $$R[\rho,\sigma,\Omega(t-\tau)] = R[\rho,\sigma,"\Omega(t-\tau)] \quad (6.3)$$

where the detection fixes the angle $\angle OPU$ only up to one sign. We include this ambiguity when relating P-equivalent vectors to detections, by having each detection fix the following class of vectors.

$$\{r_0\}_P \cup \{r_0^*\}_P.$$

Here, $r_0 0^*$ is defined from $r_0$ by $$r_0=OU, \, r_{0^*}=OU^*, \, |OU^*|=|OU|, \, \angle OPU^*=-\angle OPU.$$

It is noted that if $\{r_0\}_P \cup \{r_0\}_W$ contains one element, then $\{r_0^*\}_P \cup \{r_0^*\}_W$ contains one element. This follows directly from the fact that mirroring of all elements in the classes $\{r_0\}_P$, and $\{r_0\}_W$ in the connecting line PW maps $\{r_0\}_P \rightarrow \{r_0^*\}_P$ and $\{r_0\}_W \rightarrow \{r_0^*\}_W$. Thus, the result is that association only fixes the air target up to the ambiguity $r_0 \leftrightarrows r_0^*$ where $r_0^*$ is the mirror image of $r_0$ in line PW.

What is claimed is:

1. A radar station placed on the surface of the earth in a vehicle, a vessel or a stationary installation, comprising a transmitter, an antenna system for transmitting and receiving, a receiver and signal-processing equipment, characterised in that the radar station is adapted, with a periodicity of 10 Hz–10 kHz, to transmit and receive radar signals of arbitrary polarisation, having a maximum frequency below 500 MHz and a bandwidth exceeding 50% of the maximum frequency, that the signal-processing equipment is adapted to arrange data in range, R, and time, t, on the assumption that the time for the transmission of the radar signal and the reception of the reflex is determined with an accuracy given by the bandwidth, that the signal-processing equipment is adapted to handle data from a large number of transmission periods, of the order of $10^2$–$10^4$, and to carry out an independent summation over each combination of range and time which, on the basis of a-priori knowledge about speed and acceleration performance of the targets to be detected, constitutes a physically-technically possible range history, R(t), and that the signal-processing equipment is adapted to select the radar amplitudes for range histories that exceed a predetermined threshold value and indicate them as detected targets.

2. A radar station as claimed in claim 1, characterised in that the signal-processing equipment is adapted to sum over all the range histories by assuming that targets travel at a constant speed and a constant transverse acceleration in a fixed two-dimensional plane during the integration time, which means that the paths during this time are assumed to form segments of a circle, dividing the amount of such paths into a large number of classes where each class of paths by conformal transformation is mapped on points covering the surface of a two-dimensional sphere, describing the distribution of reflectivities for different targets as functions, one for each class, defined on the sphere, calculating the average values of these reflectivity functions over all the circles, and calculating the reflectivity for all target movements with the aid of a known tomography method for reconstructing from such circular average values a reflectivity function on the sphere.

3. A radar station as claimed in claim 2, characterised in that the signal-processing equipment
comprises a massively parallel processor consisting of a large number of parallel-acting nodes and
that it is adapted to relate each class of paths mapped on the sphere by a certain conformal transformation, to its special node and to establish a target detection by each node being designed to reconstruct a reflectivity function from radar data for this special subclass.

4. A radar station as claimed in claim 1, characterised in that the antenna system consists of a small, easily transportable antenna having a substantially omnidirectional antenna diagram.

5. A radar system, characterised in that it comprises at least two radar stations designed as claimed in claim 1, said radar stations being located in known positions, and communication equipment interconnecting the signal processing equipment of different stations, that the signal-processing equipment is adapted to associate target positions detected from individual radar stations by estimating, for each detected target path at each radar station, the time linear and quadratic range variation for the target, calculating, on the basis of such estimates, the linear and quadratic range variation of the target path such as it is estimated from the other stations, determining whether the linear and quadratic range variations estimated from data from the different stations agree and, if so, calculating the position of the detected target by triangulation.

6. A radar system as claimed in claim 5, characterised in that the signal-processing equipment is adapted to associate target positions detected from individual radar stations by determining a circular target path for each target in the manner recited in claim 3, representing the target by a vector pointing from the centre of curvature of the path to the position on the path when detecting the target, which can be determined from data from the individual radar station up to a rigid rotation about the position of the radar, forming the difference between this vector, derived from data from one station and derived from data from another station, varying these two vector values by varying the orientation of the position vector for the target position, as seen from one or the other station, and determining the minimum of the difference between the vectors associated with the respective stations, whereby the orientation of the target relative to the connecting axis between the two stations is estimated.

7. A radar system as claimed in claim 6, characterised in that it comprises a set of at least three radar stations, and that the signal-processing equipment is adapted to carry out said varation pairwise for at least three pairs of radar stations in the set, whereby the position of the target in space is entirely determined.

* * * * *